(12) United States Patent
Park (10) Patent No.: US 9,410,585 B2
(45) Date of Patent: Aug. 9, 2016

(54) METHOD AND SYSTEM FOR LEARNING OPERATION OF ENGINE CLUTCH OF HYBRID VEHICLE

(71) Applicants: Hyundai Motor Company, Seoul (KR); Kia Motors Corporation, Seoul (KR)

(72) Inventor: Joonyoung Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 298 days.

(21) Appl. No.: 13/861,661

(22) Filed: Apr. 12, 2013

(65) Prior Publication Data

US 2014/0129104 A1 May 8, 2014

(30) Foreign Application Priority Data

Nov. 8, 2012 (KR) .......................... 10-2012-0126233

(51) Int. Cl.
*F16D 48/06* (2006.01)

(52) U.S. Cl.
CPC .............. *F16D 48/06* (2013.01); *F16D 48/066* (2013.01); *F16D 2500/1066* (2013.01); *F16D 2500/3024* (2013.01); *F16D 2500/3058* (2013.01); *F16D 2500/30808* (2013.01); *F16D 2500/70217* (2013.01); *F16D 2500/70252* (2013.01); *F16D 2500/70282* (2013.01); *F16D 2500/70406* (2013.01); *F16D 2500/70605* (2013.01)

(58) Field of Classification Search
USPC ....................................................... 701/41–99
See application file for complete search history.

(56) References Cited

U.S. PATENT DOCUMENTS

| 8,589,042 B2* | 11/2013 | Williams ................ F16D 48/06 477/169 |
| 8,631,891 B2* | 1/2014 | Wilmanowicz et al. ..... 180/69.3 |
| 2004/0166992 A1* | 8/2004 | Buchanan ............... F16D 48/06 477/181 |
| 2007/0123388 A1* | 5/2007 | Petrzik et al. .................. 477/174 |
| 2009/0248265 A1* | 10/2009 | Tabata ................... B60K 6/365 701/59 |
| 2012/0135838 A1* | 5/2012 | Cuppers et al. .................. 477/77 |
| 2012/0316028 A1* | 12/2012 | Kobayashi ............... B60K 6/48 477/5 |
| 2013/0060435 A1* | 3/2013 | Shultz et al. .................... 701/60 |
| 2013/0165282 A1* | 6/2013 | Hattori et al. ................... 474/28 |

(Continued)

FOREIGN PATENT DOCUMENTS

| JP | 2010143448 A | 7/2010 |
| JP | 2012086596 A | 5/2012 |
| KR | 10-1047399 | 5/2008 |

*Primary Examiner* — Adam Tissot
*Assistant Examiner* — Timothy Nesley
(74) *Attorney, Agent, or Firm* — Mintz Levin Cohn Ferris Glovsky and Popeo, P.C.; Peter F. Corles (57) ABSTRACT

A method and a system of learning an operation of an engine clutch using a hydraulic pressure sensor and a motor of a vehicle. The method includes determining, by a controller, whether power transmission of a transmission that transmits output from the engine and the motor has been interrupted and increasing, by the controller, pressure of the engine clutch to a target pressure with a predetermined ratio when the power transmission has been interrupted. In addition, measuring, by the controller, actual pressure of the engine clutch using a hydraulic pressure sensor when pressure of the engine is increased with the predetermined ratio to the target pressure and calculating, by the controller, a difference value between the measured actual pressure and target pressure. Furthermore, adjusting, by the controller, pressure of the engine clutch to correlate the actual pressure of the engine clutch to the target pressure based on the difference value.

8 Claims, 10 Drawing Sheets

(56) References Cited

U.S. PATENT DOCUMENTS

| | | | |
|---|---|---|---|
| 2013/0218391 A1* | 8/2013 | Aizawa et al. | 701/22 |
| 2013/0296136 A1* | 11/2013 | Doering et al. | 477/167 |
| 2013/0325230 A1* | 12/2013 | Kim | B60W 10/08 701/22 |
| 2014/0244091 A1* | 8/2014 | Eto | B60K 6/48 701/22 |
| 2014/0257618 A1* | 9/2014 | Hiasa et al. | 701/22 |
| 2014/0277974 A1* | 9/2014 | Teslak et al. | 701/54 |
| 2014/0323267 A1* | 10/2014 | Reed | B60W 10/02 477/5 |

\* cited by examiner

FIG.1

PRIOR ART

PRIOR ART

METHOD AND SYSTEM FOR LEARNING OPERATION OF ENGINE CLUTCH OF HYBRID VEHICLE

CROSS-REFERENCE TO RELATED APPLICATION

This application claims priority to and the benefit of Korean Patent Application No. 10-2012-0126233 filed in the Korean Intellectual Property Office on Nov. 8, 2012, the entire contents of which are incorporated herein by reference.

BACKGROUND (a) Field of the Invention

The present invention relates to a method and a system that learns an operation of an engine clutch using a hydraulic pressure sensor and a motor of a hybrid vehicle.

(b) Description of the Related Art

Figure 1:
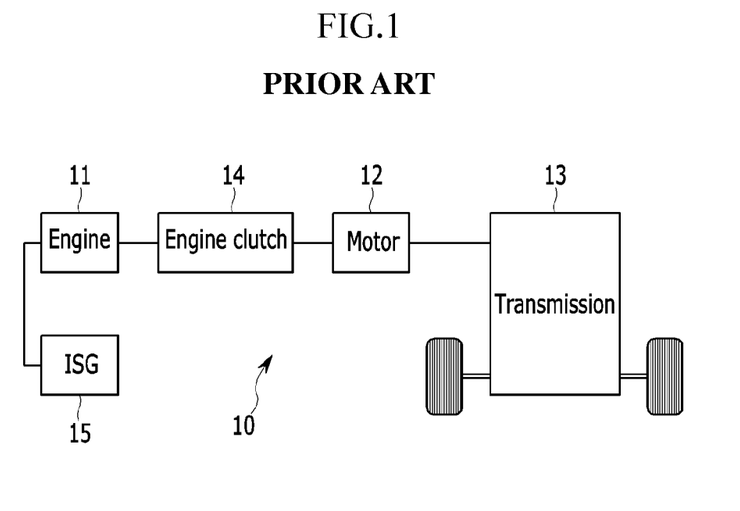
FIG. 1 is an exemplary diagram illustrating a configuration of a general hybrid vehicle according to the related art.

In general, a hybrid vehicle may reduce exhaust gas and improve fuel efficiency by using a motor as a power source, as well as an engine. In the hybrid vehicle, as illustrated in FIG. 1, an engine 11, a motor 12 and a transmission 13 may be arranged in series. It should be noted, however, that hybrid vehicles may be arranged in many different configurations, including in parallel, in which case the engine and the motor are engaged and disengaged from the transmission accordingly.

Figure 2:
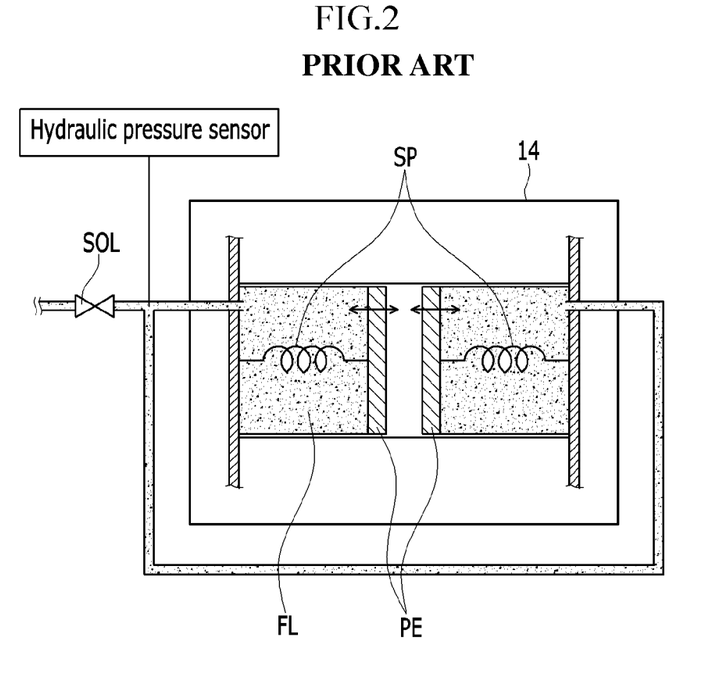
FIG. 2 is an exemplary diagram illustrating a configuration of a general engine clutch according to the related art.

In the hybrid vehicle 10, an engine clutch 14 that transmits driving power and blocks transmission of the driving power may be disposed between the engine 11 and the motor 12. FIG. 2 is a conceptual diagram of the engine clutch 14. As illustrated in FIG. 2, the engine clutch 14 may include a friction material PE (polyethylene) moving via pressure (e.g., hydraulic pressure) from a fluid (e.g., oil) FL of which quantity is controlled by operation of a solenoid valve SOL and a return spring SP to restore the friction material PE to an original state when operation hydraulic pressure is released from the friction material PE. The solenoid valve SOL is generally controlled by a current. Hydraulic pressure applied to engine clutch 14 from the solenoid valve SOL may be measured with a hydraulic pressure sensor. For example, the hydraulic pressure sensor may be a hydraulic pressure sensor applied to a DCT (dual clutch transmission).

Figure 3:
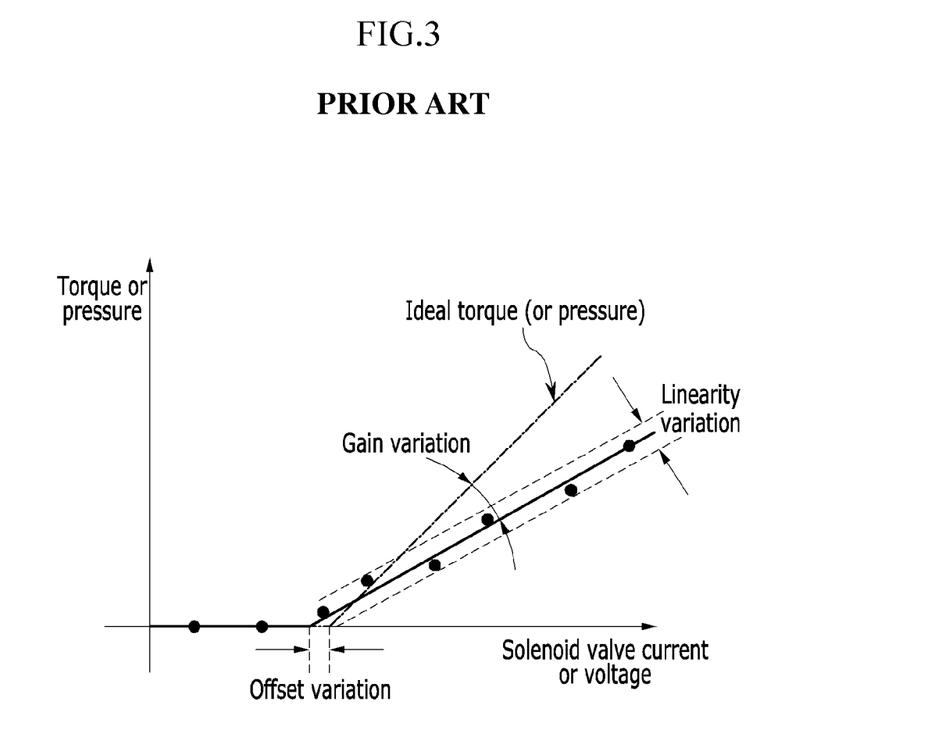
FIG. 3 is an exemplary graph illustrating operation variations of a general engine clutch according to the related art.

The solenoid valve SOL is operated to allow the hydraulic pressure applied to the friction material PE to increase as current applied to the solenoid valve SOL increases. When the hydraulic pressure applied to the friction material PE increases, contact frictional force of the friction material PE increases. Accordingly, as illustrated in FIG. 3, torque transmitted by the engine clutch 14 is increased in proportion to the current applied to the solenoid valve SOL.

In the hybrid vehicle 10, an integrated starter generator (ISG) 15 that operates the engine 11 or operates as a generator may be mounted to the engine 11. The ISG 15 may be called a hybrid starter generator (HSG) in vehicle manufacturing.

The hybrid vehicle 10 may run in an electric vehicle (EV) mode that utilizes power from the motor 12 to provide a driving force to the transmission and output shaft. Further, the hybrid vehicle 10 may also run in a hybrid vehicle (HEV) mode using torque from the engine 11 as main power and torque from the motor 12 as auxiliary power. Further, the hybrid vehicle 10 may run in a regenerative braking (RB) mode in which braking and inertia energy of the hybrid vehicle is collected through power generated by the motor and the battery is charged when the hybrid vehicle 10 brakes or runs by inertia.

As described above, the hybrid vehicle 10 operates the engine clutch 14 to transmit power or separate power between the motor 12 and the engine 11 for switching the mode and the like. Operation hydraulic pressure of the engine clutch that determines an operation of the engine clutch 14 influences drivability, power performance, and fuel efficiency of the hybrid vehicle, thus, the operation hydraulic pressure of the engine clutch needs to be controlled accurately.

However, operation variations of the engine clutch, as illustrated in FIG. 3, may be generated according to characteristics and operating environments of the engine clutch. The operation variations may include an offset variation associated with torque transmission start hydraulic pressure, a gain variation associated with transmission torque, and a linearity variation.

Each variation described above may be generated by characteristics of the engine clutch, the solenoid valve, and the like. Further, the each variation may be generated based on a difference between respective components of the engine clutch, for example, component assembling tolerance, characteristic deviation of current-versus-pressure of the solenoid valve, and characteristic deviation according to passage of a usage period. When the each variation is not corrected through learning, it may negatively influence drivability, power performance, and fuel efficiency of the hybrid vehicle.

In a method of correcting each variation through learning according to the related art, accuracy of learning may be low and time of learning may be long since only a hydraulic pressure sensor or a motor is used. In other words, when learning is performed using only the hydraulic pressure sensor, accuracy of the learning may be low due to the offset variation and gain variation of the hydraulic pressure sensor, and mechanical deviation of the engine clutch and the solenoid valve generated after applying the pressure. Further, when learning is performed using only the motor, time of the learning may be long since learning is individually performed at each applied pressure to correct linearity variation.

The above information disclosed in this section is only for enhancement of understanding of the background of the invention and therefore it may contain information that does not form the prior art that is already known in this country to a person of ordinary skill in the art.

SUMMARY

The present invention provides a method and a system that learns an operation of a engine clutch of a hybrid vehicle to perform substantially accurate learning and to decrease learning time by using a slip at both end points of a pressure control section and by comparing a target pressure with a measured pressure using a hydraulic pressure sensor between the end points of the pressure control section.

An exemplary embodiment of the present invention provides a method of learning an operation of an engine clutch of a hybrid vehicle which connects and cuts off power between an engine and a motor by engaging or disengaging the engine with the motor, the method including: determining whether power transmission of a transmission that transmits output from the engine and the motor has been interrupted; increasing pressure of the engine clutch to a target pressure with a predetermined ratio when the power transmission has been interrupted; measuring actual pressure of the engine clutch using a hydraulic pressure sensor when pressure of the engine is increased with the predetermined ratio to the target pressure; calculating a difference value between the measured actual pressure and the target pressure; and adjusting pressure of the engine clutch to correlate the actual pressure of the engine clutch to the target pressure based on the difference value.

The increasing of the pressure of the engine clutch to the target pressure with the predetermined ratio may include increasing the pressure of the engine clutch to the target pressure in a step-like manner. The transmission may be an automatic transmission, and when the transmission is in park (P) or neutral (N), whether the power transmission of the transmission has been interrupted may be determined. The number of steps to increase the pressure of the engine clutch in the step-like manner may be at least two.

The measuring of the actual pressure of the engine clutch using the hydraulic pressure sensor may include measuring the pressure of the engine clutch increased in the step-like manner at least two points. In addition, the measuring of the actual pressure of the engine clutch using the hydraulic pressure sensor may include measuring the target pressure of the engine clutch in a pressure range in which linear characteristics of the hydraulic pressure sensor are maintained.

Another exemplary embodiment of the present invention provides a method of learning an operation of an engine clutch of a hybrid vehicle which connects and cuts off power between an engine and a motor by engaging or disengaging the engine with the motor, the method including: determining whether power transmission of a transmission that transmits output from the engine and the motor has been interrupted; controlling the engine and the motor at different speeds, setting torque of the motor as a first steady state torque when speed of the motor reaches a first steady state; increasing the pressure of the engine clutch and setting pressure to change torque of the motor from the first steady state torque to a predetermined torque as a starting pressure of torque transmission; supplying learning pressure that is greater than the starting pressure of torque transmission to the engine clutch, setting torque of the motor as a second steady state torque when speed of the motor reaches a second steady state; and learning a linear relation between pressure of the engine clutch and torque transmitted through the engine clutch based on a ratio of a difference value between the start pressure of the torque transmission and the learning pressure and a difference value between the first steady state torque and the second steady state torque.

The learning of the linear relation between the pressure of the engine clutch and the torque transmitted through the engine clutch may include: increasing pressure of the engine clutch to a predetermined target pressure based on a predetermined ratio, wherein the predetermined target pressure may be between the start pressure of the torque transmission and the learning pressure; measuring actual pressure of the engine clutch using a hydraulic pressure sensor when the pressure of the engine clutch increases to the predetermined target pressure based on the predetermined ratio; calculating a difference value between the measured actual pressure of the engine clutch and the predetermined target pressure; and adjusting the pressure of the engine clutch to correspond to the predetermined target pressure based on the difference value.

Yet another exemplary embodiment of the present invention provides a system that learns an operation of an engine clutch of a hybrid vehicle, the system including: an engine clutch disposed between an engine and a motor of the hybrid vehicle to engage or disengage the engine and the motor; a solenoid valve configured to provide pressure to the engine clutch; a pressure detector configured to detect pressure of the engine clutch; an integrated starter generator (ISG) configured to start the engine or generate power; a transmission configured to shift power applied to the vehicle wheels based on an operation of a shift stage lever and provide power accordingly; and a control unit configured to learn an operation of the engine clutch by operating the engine, the motor, the transmission, the ISG, the engine clutch, and the solenoid valve and monitoring states of the engine, the motor, the transmission, the ISG, the engine clutch, and the solenoid. The control unit executes program instructions via a processor that performs a method of a learning operation of an engine clutch of a hybrid vehicle, the method including: determining whether power transmission of a transmission that transmits the output from the engine and the motor has been interrupted; increasing pressure of the engine clutch to a target pressure with a predetermined ratio when the power transmission has been interrupted; measuring actual pressure of the engine clutch using a hydraulic pressure sensor when pressure of the engine is increased with the predetermined ratio to the target pressure; calculating a difference value between the measured actual pressure and the target pressure; and adjusting pressure of the engine clutch to correlate the actual pressure of the engine clutch to the target pressure based on the difference value.

Yet the other exemplary embodiment of the present invention provides a system that learns an operation of an engine clutch of a hybrid vehicle, the system including: an engine clutch disposed between an engine and a motor of the hybrid vehicle to engage or disengage the engine and the motor; a solenoid valve configured to provide pressure to the engine clutch; a pressure detector configured to detect pressure of the engine clutch; an integrated starter-generator (ISG) configured to start the engine or generate power; a transmission configured to shift power applied to vehicle wheels based on an operation of a shift stage lever and provide power accordingly; and a control unit configured to learn the operation of the engine clutch by operating the engine, the motor, the transmission, the ISG, the engine clutch, and the solenoid valve and monitoring states of the engine, the motor, the transmission, the ISG, the engine clutch, and the solenoid. The control unit executes program instructions via a processor that performs a method of a learning operation of an engine clutch of a hybrid vehicle, the method including: determining whether power transmission of a transmission that transmits the output from the engine and the motor has been interrupted; controlling the engine and the motor at different speeds, and setting torque of the motor as a first steady state torque when speed of the motor reaches a first steady state; increasing pressure of the engine clutch, setting pressure to change torque of the motor from the first steady state torque to a predetermined torque as a starting pressure of torque transmission; supplying a learning pressure that is greater than the starting pressure of torque transmission to the engine clutch, setting torque of the motor as a second steady state torque when speed of the motor reaches a second steady state; and learning a linear relation between pressure of the engine clutch and torque transmitted through the engine clutch based on a ratio of a difference value between the start pressure of the torque transmission and the learning pressure and a difference value between the first steady state torque and the second steady state torque.

As described above, according to the exemplary embodiment of the present invention, it may be possible to perform substantially accurate learning and to decrease learning time using a slip at both end points of a pressure control section and by comparing a target pressure with a measured pressure using a hydraulic pressure sensor between the end points of the pressure control section.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller (e.g., control unit) or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present invention will be described in detail with reference to the accompanying drawings.

Figure 4:
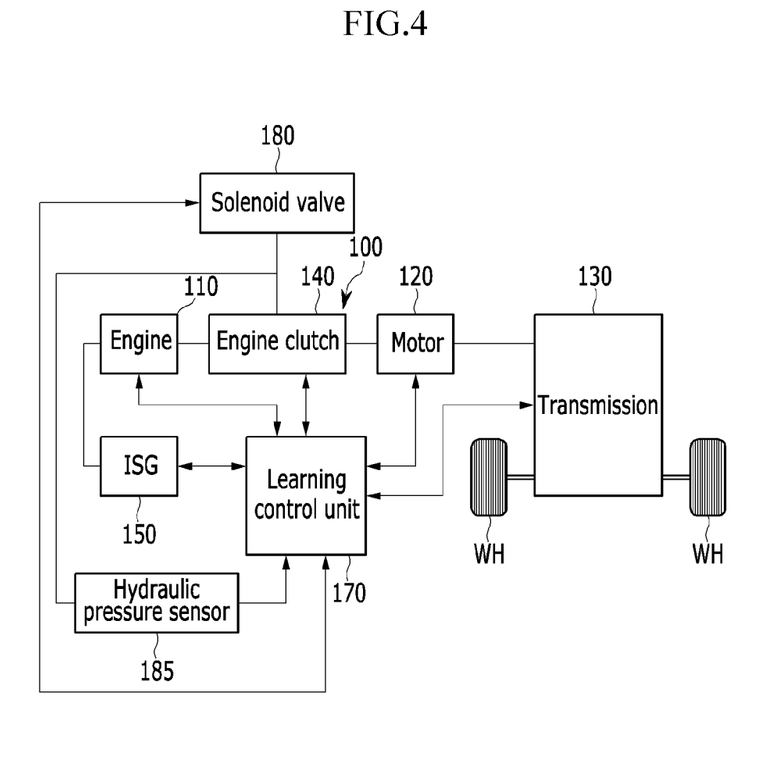
FIG. 4 is an exemplary diagram of a system that learns an operation of an engine clutch of a hybrid vehicle according to an exemplary embodiment of the present invention.

FIG. 4 is an exemplary diagram of a system that learns an operation of an engine clutch of a hybrid vehicle according to an exemplary embodiment of the present invention. The system that learns the operation of the engine clutch of the hybrid vehicle according to the exemplary embodiment of the present invention may be a system that learns the operation of the engine clutch which engages and disengages an engine and a motor for operating in an EV mode or an HEV mode of a hybrid vehicle.

The system that learns the operation of the engine clutch of the hybrid vehicle 100 may include: an engine 110; a motor 120; a transmission 130 that varies driving power of the engine 110 and the motor 120 and transmits the varied driving power to vehicle wheels (WH) or blocks transmission of the varied driving power; an engine clutch 140 disposed between the engine 110 and the motor 120 to engage or disengage the engine 110 and the motor 120; a solenoid valve 180 configured to provide pressure to the engine clutch 140; and a hydraulic pressure sensor 185 configured to detect pressure of the engine clutch 140. An integrated starter generator (ISG) 150 may be provided to start the engine 110 or to generate power. A control unit (e.g., made up of one or more controllers operating as a unit) 170 may be configured to learn operation of the engine clutch 140 by checking/monitoring states of the engine 110, the motor 120, the transmission 130, the ISG 150, the engine clutch 140, and the solenoid valve 180 while operating the engine 110, the motor 120, the transmission 130, the ISG 150, the engine clutch 140, and the solenoid valve 180, which are included in a hybrid vehicle.

The engine 110, the motor 120, the transmission 130, the engine clutch 140, and the ISG 150 are components generally mounted in the hybrid vehicle 100, so detailed descriptions thereof will be omitted in the present specification. The solenoid valve 180 may correspond to the solenoid valve described in FIG. 2, but it should be understood that the scope of the present invention is not limited thereto. Other configurations capable of substantially providing pressure to operate the engine clutch 140 may be used in the present invention.

In an exemplary embodiment of the present invention, for example, the hydraulic pressure sensor 185 that detects pressure operating in the engine clutch 140 may be formed as a sensor corresponding to a hydraulic pressure sensor applied to a DCT (double clutch transmission), but it should be understood that the scope of the present invention is not limited thereto. Other configurations capable of substantially detecting the pressure operating in the engine clutch 140 may be used in the present invention.

The control unit 170 may include one or more microprocessors operated by program instructions executed thereon. The program instructions may include a series of commands that perform a method of learning an operation of an engine clutch according to an exemplary embodiment of the present invention which will be described below.

In the exemplary embodiment of the present invention, the control unit 170 may include an engine control unit (ECU) that operates the engine 110 of the hybrid vehicle 100, a motor control unit (MCU) that operates the motor 120, and a hybrid control unit (HCU) that operates the general operation of the hybrid vehicle 100. In the exemplary method of learning operation of an engine clutch according to an exemplary embodiment of the present invention which will be described below, some processes may be performed by the engine control unit, other processes may be performed by the motor control unit, and yet other processes may be performed by the hybrid control unit. However, it should be understood that the scope of the present invention is not limited to the exemplary embodiment to be described below. The control unit may be implemented with a combination different from that described in the exemplary embodiment of the present invention. Furthermore, the engine control unit, the motor control unit, and the hybrid control unit may perform a combination of processes different from that described in the exemplary embodiment of the present invention.

In the exemplary embodiment of the present invention, the engine control unit, the motor control unit, and the hybrid control unit included in the control unit 170 may be mounted in the hybrid vehicle, so configurations and operations thereof are obvious to those skilled in the art and thus detailed descriptions thereof will be omitted.

Hereinafter, a method of learning an operation of an engine clutch of a hybrid vehicle according to an exemplary embodiment of the present invention will be described in detail with reference to the accompanying drawings.

Figure 5:
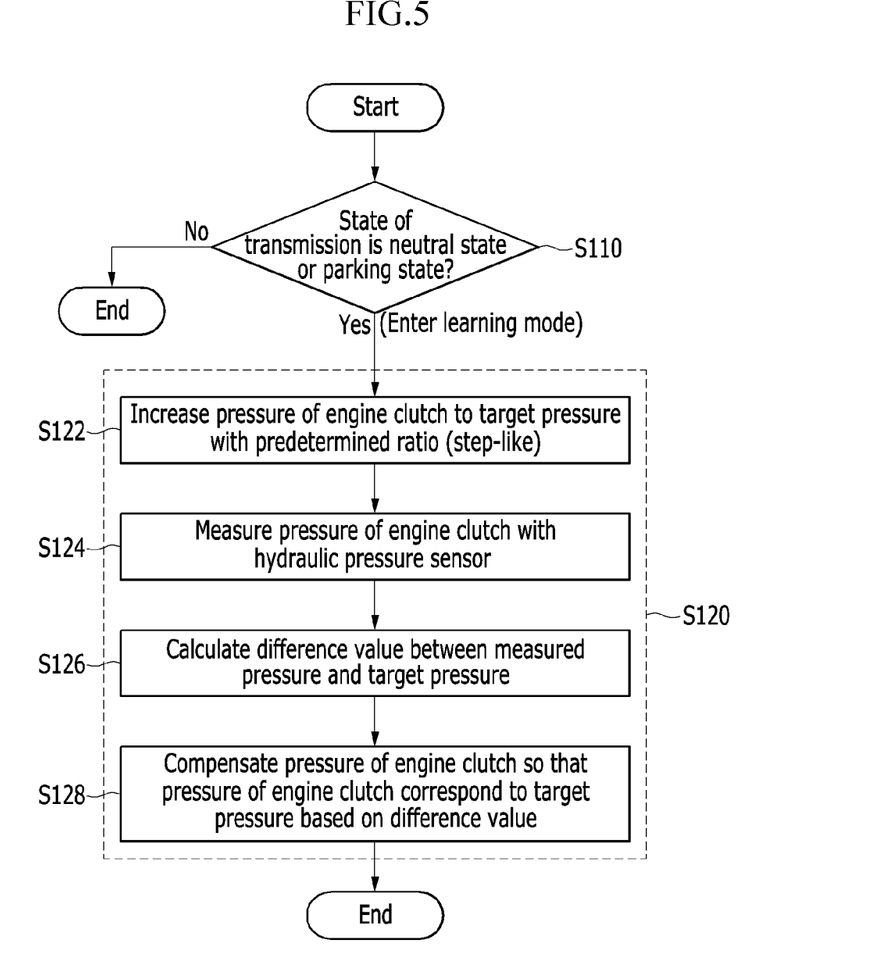
FIG. 5 is an exemplary flowchart of a method of learning operation of an engine clutch of a hybrid vehicle according to an exemplary embodiment of the present invention.

FIG. 5 is an exemplary flowchart of a method of learning operation of an engine clutch of a hybrid vehicle according to an exemplary embodiment of the present invention.

Figure 10:
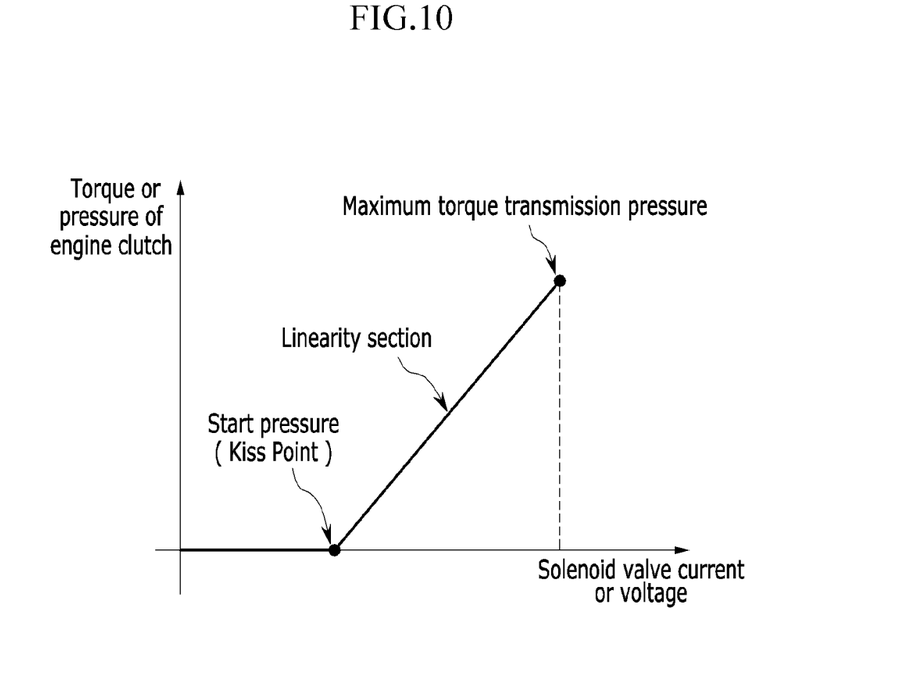
FIG. 10 is an exemplary graph illustrating operation of an engine clutch after learning according to an exemplary embodiment of the present invention.

The method of learning the operation of the engine clutch of the hybrid vehicle according to the exemplary embodiment of the present invention is a method of learning and controlling operation of the engine clutch to allow the engine clutch to be linearly operated, as illustrated in the graph of FIG. 10 by correcting the linearity variation of the engine clutch illustrated in FIG. 3.

To perform the method of learning the operation of the engine clutch of the hybrid vehicle according to the exemplary embodiment of the present invention, when a gear shift stage is in a park or neutral state, the control unit 170, as illustrated FIG. 5, may be configured to enter a learning mode (S110). When the gear shift stage is in P or N, the engine 110 and the motor 120 may be in a no-load state and the hybrid vehicle 100 may be in a non-movement state. In other words, when the gear shift stage is in P or N, an accelerator is not operated (e.g., an opening angle of an accelerator position sensor is equal to 0 degrees), thus, the vehicle is not operated. Accordingly, the control unit 170 may be configured to determine whether the gear stage of the transmission 130 is in a park or neutral state, and when the gear stage of the transmission 130 is in a park or neutral state, the control unit 170 may be configured to determine that the vehicle is not currently being operated, that is, the operation is not affected even though the learning progresses, thus, the control unit 170 may be configured to enter a learning mode. The gear stage of the transmission 130, for example, may be identified by an inhibitor switch, which is apparent to a person of ordinary skill in the art.

After entering the learning mode, the control unit 170 may be configured to increase the pressure of the engine clutch 140 to a target pressure with a predetermined ratio (S122). The target pressure may be between a torque transmission start pressure and a learning pressure that will be described below.

As illustrated in FIG. 10, the torque transmission start pressure may correspond to a kiss point, and the learning pressure may correspond to a maximum torque transmission pressure.

Figure 7:
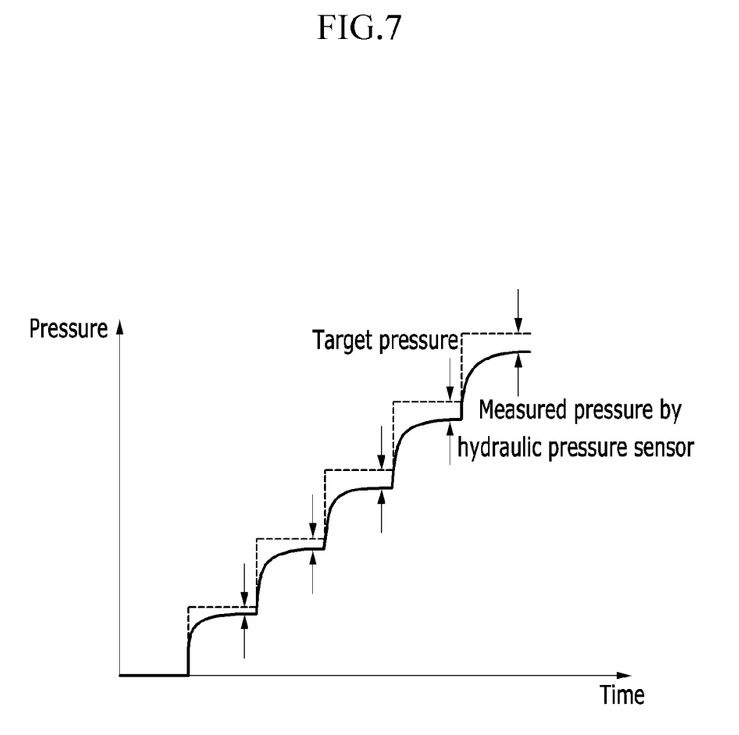
FIG. 7 is an exemplary graph explaining learning of linearity variation according to an exemplary embodiment of the present invention.

The control unit 170 may be configured to operate the solenoid valve 180 to increase the pressure of the engine clutch 140 to the target pressure in a step-like manner, as illustrated in FIG. 7. When the control unit 170 is configured to increase the pressure of the engine clutch 140 to the target pressure in the step-like manner, the number of steps may be at least two to obtain operation characteristic of the engine clutch 140 like a primary function graph illustrated in FIG. 10.

As described above, while the control unit 170 is configured to increase the pressure of the engine clutch 140 to the target pressure in the step-like manner, an actual pressure of the engine clutch 140 may be measured by the hydraulic pressure sensor 185. For example, the actual pressure of the engine clutch 140 measured by the hydraulic pressure sensor 185 is illustrated in FIG. 7. In addition, since the hydraulic pressure sensor 185 exhibits linear characteristics, when learning is performed with pressure of the engine clutch 140 measured by the hydraulic pressure sensor 185, the engine clutch 140 may be linearly operated as illustrated in the graph of FIG. 10 after the learning.

The control unit 170 may be configured to measure the actual pressure of the engine clutch 140 that is increased in the step-like manner on at least two points (S124) using the hydraulic pressure sensor 185. After measuring the actual pressure of the engine clutch 140 using the hydraulic pressure sensor 185, the control unit 170 may be configured to calculate a difference value between the measured actual pressure of the engine clutch 140 and the target pressure corresponding to the measured actual pressure (S126). After calculating the difference value, the control unit 170 may be configured to calculate a compensation value based on the difference value to correspond the actual pressure of the engine clutch 140 to the target pressure, and then the control unit 170 may be configured to apply the compensation value to the engine clutch 140 when the engine clutch 140 is operated (S128).

Accordingly, the method of learning the operation of the engine clutch according to the exemplary embodiment of the present invention may measure pressure of the engine clutch using the hydraulic pressure sensor exhibiting linear characteristics, and may calculate a linear compensation value to cause an actual pressure of the engine clutch to correspond to a target pressure based on the measured pressure of the engine clutch.

Figure 6:
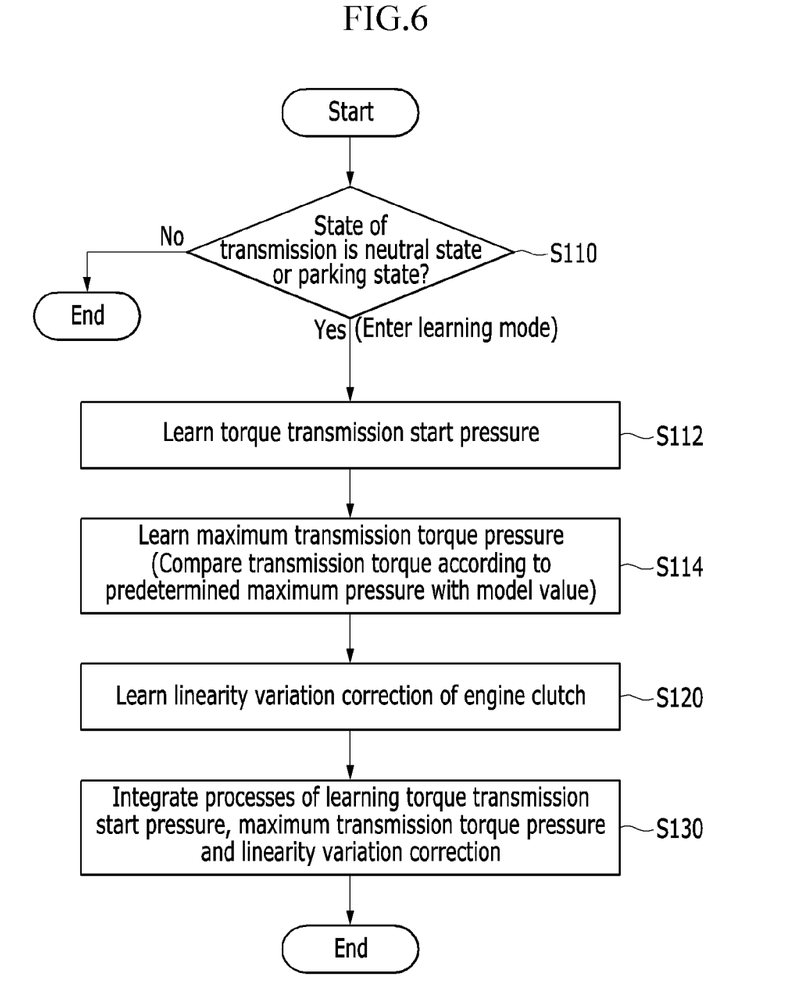
FIG. 6 is an exemplary flowchart of a method of learning operation of an engine clutch of a hybrid vehicle according to another exemplary embodiment of the present invention.

The method of learning the operation of the engine clutch according to the exemplary embodiment of the present invention consisting of S122 to S128 is a method used to learn and compensate a linearity variation as illustrated in FIG. 3. S122 to S128 are referred to as S120 in FIG. 5 and FIG. 6. FIG. 6 is an exemplary flowchart of a method of learning operation of an engine clutch of a hybrid vehicle according to another exemplary embodiment of the present invention. The method may integrate the learning method of correcting the linearity variation described above with reference to FIG. 5 with a method of learning torque transmission start pressure and a method of learning maximum transmission torque pressure.

To perform the method of learning the operation of the engine clutch of the hybrid vehicle according to the another exemplary embodiment of the present invention, when a gear shift stage is in a park or neutral mode, the control unit 170 may be configured to enter a learning mode (S110). In addition, the control unit 170 may be configured to perform the process of S110 in a manner similar to the process of S110 in FIG. 5.

Figure 8:
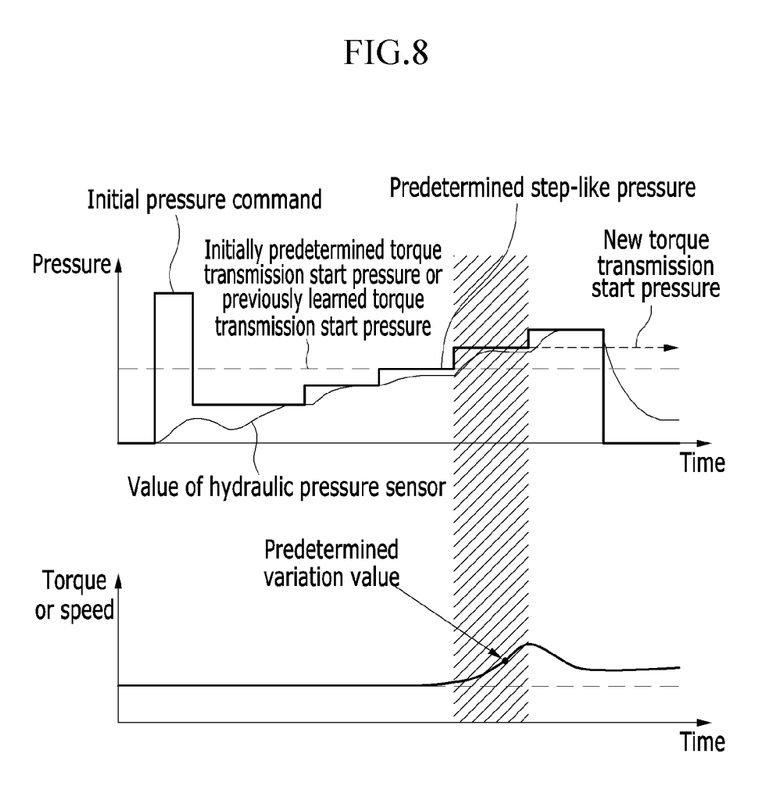
FIG. 8 is an exemplary graph explaining learning of offset (torque transmission start pressure) variation according to an exemplary embodiment of the present invention.

After entering the learning mode, the control unit 170 may be configured to perform the processes of learning the torque transmission start pressure of the engine clutch 140 to correct the offset variation illustrated in FIG. 3 (S112). To operate the engine 110 and the motor 120 at different speeds, the control unit 170 may be configured to increase the pressure of the engine clutch 140 in a step-like manner as illustrated in FIG. 8, by setting a pressure of the engine clutch 140 that causes a torque change of the motor 120 as a torque transmission start pressure. In other words, the control unit 170 may be configured to operate the engine 110 and the motor 120 at different speeds, by setting the torque of the motor as a first steady state torque when the speed of the motor 120 reaches a first steady state. Then, the control unit 170 may be configured to increase the pressure of the engine clutch 140 and set the pressure that changes torque of the motor 120 from the first steady state torque to a predetermined torque as a torque transmission start pressure.

In step S112, when setting the torque transmission start pressure as illustrated in FIG. 10, the control unit 170 may be configured to perform the processes of learning a maximum transmission torque pressure of the engine clutch 140 to correct the gain variation as illustrated in FIG. 3. The maximum transmission torque pressure may be a random learning pressure that is greater than the torque transmission start pressure. The term "maximum" of the maximum transmission torque pressure is only used to emphasize that the maximum transmission torque pressure is greater than the torque transmission start pressure. To learn the maximum transmission torque pressure as the random learning pressure that is greater than the torque transmission start pressure, while the control unit 170 is configured to operate the engine 110 and the motor 120 at different speeds and apply the maximum transmission torque pressure to the engine clutch 140, the control unit 170 may be configured to measure torque of the motor 120. The control unit 170 may be configured to set a maximum transmission torque pressure based on the measured pressure of the engine clutch 140.

In other words, while applying the random learning pressure that is greater than the torque transmission start pressure to the engine clutch 140, when speed of the motor 120 reaches a first steady state, the control unit 170 may be configured to set torque of the motor 120 corresponding to the speed of the motor 120 as the maximum transmission torque pressure.

Figure 9:
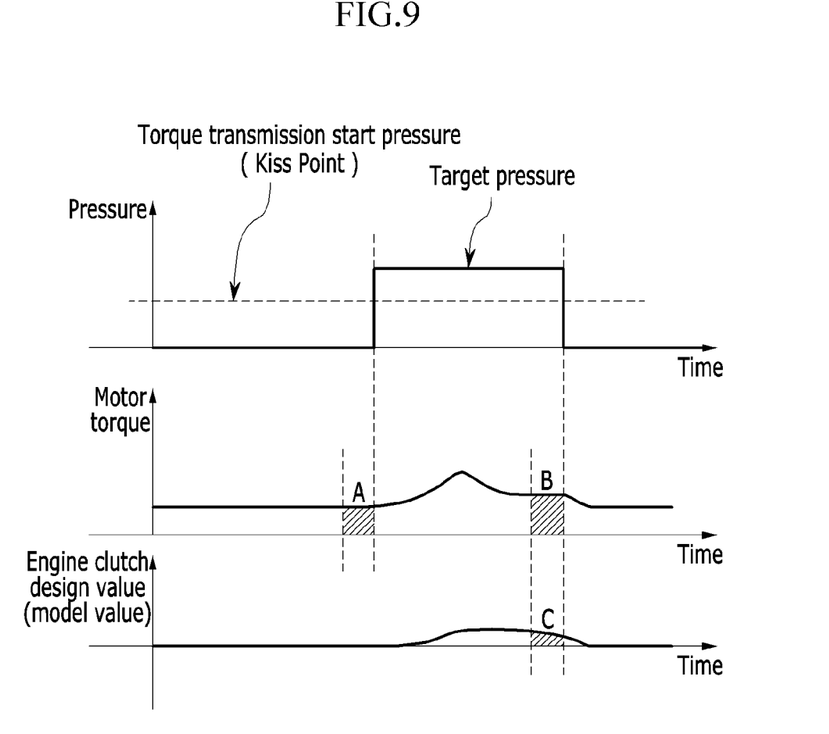
FIG. 9 is an exemplary graph explaining learning of gain variation according to an exemplary embodiment of the present invention.

In another exemplary embodiment of the present invention to set a maximum torque transmission pressure, as illustrated in FIG. 9, before the control unit 170 is configured to apply a maximum target pressure as a random learning pressure that is greater than the torque transmission start pressure to the engine clutch 140, the control unit 170 may be configured to measure torque (A) of the motor 120, and after applying the maximum target pressure to the engine clutch 140, measure torque (B) of the motor 120. Then, the control unit 170 may be configured to calculate a difference value (B−A) between the torques (A) and (B), and set a maximum torque transmission pressure as illustrated in FIG. 10 based on a value ((B−A)/C) of the difference value (B−A) divided by a characteristic design value (C) corresponding to a model value of the engine clutch 140.

After setting the maximum torque transmission pressure, the control unit 170 may be configured to learn linear relations of pressure of the engine clutch 140 and torque transmitted by the engine clutch 140 based on a ratio of a difference value between the torque transmission start pressure and the learning pressure and a difference value between the initial steady state and the maximum steady state torque. In other words, the control unit 170 may be configured to perform the processes of learning linear variation correction on the engine clutch described with reference to FIG. 5

When processes of learning the torque transmission start pressure, the maximum transmission torque pressure, and the linear operation pressure have been performed, the control unit 170 may be configured to integrate the pressures as illustrated in FIG. 10 (S130). In particular, after setting the torque transmission start pressure and the maximum torque transmission pressure, the control unit 170 may be configured to insert the operation characteristic obtained by learning the linear variation of the engine clutch described with reference to FIG. 5 into the linearity section in FIG. 10, to integrate the torque transmission start pressure, the maximum torque transmission pressure, and the linearity operation pressure (S130).

Accordingly, the method of learning the operation of the engine clutch and the system thereof may accomplish integrated operation learning of the engine clutch that integrates the torque transmission start pressure, the maximum torque transmission pressure, and the linearity operation pressure.

While this invention has been described in connection with what is presently considered to be exemplary embodiments, it is to be understood that the invention is not limited to the disclosed embodiments, but, on the contrary, is intended to cover various modifications and equivalent arrangements included within the spirit and scope of the appended claims.

| Description of Reference Numerals | |
| --- | --- |
| 100: hybrid vehicle | 110: engine |
| 120: motor | 130: transmission |
| 140: engine clutch | 170: control unit |
| 180: solenoid valve | 185: hydraulic pressure sensor |

What is claimed is:

1. A method of learning operation of an engine clutch of a hybrid electric vehicle which connects and cuts off power between an engine and a motor by engaging or disengaging the engine with the motor, the method comprising:
   determining, by a control unit, whether power transmission of a transmission that transmits output from the engine and the motor has been interrupted;
   operating, by the control unit, the engine and the motor at different speeds;
   setting, by the control unit, a torque of the motor as a first steady state torque when speed of the motor reaches a first steady state;
   increasing, by the control unit, a pressure of the engine clutch to engage the engine with the motor;
   after engaging the engine with the motor setting, by the control unit, the pressure to change torque of the motor from the first steady state torque to a predetermined torque as a start pressure of torque transmission;
   supplying, by the control unit, learning pressure that is greater than the start pressure of the torque transmission to the engine clutch to engage the engine with the motor;
   after engaging the engine with the motor, setting, by the control unit, the torque of the motor as a second steady state torque when speed of the motor reaches a second steady state; and
   learning, by the control unit, a linear relation between pressure of the engine clutch and the torque transmitted through the engine clutch based on a ratio of a difference value between the start pressure of the torque transmission and the learning pressure and a difference value between the first steady state torque and the second steady state torque, wherein when the transmission is in park or neutral, the power transmission of the transmission is determined, by the control unit, to have been interrupted, wherein the learning of the linear relation between the pressure of the engine clutch and the torque transmitted through the engine clutch includes:
- increasing, by the control unit, the pressure of the engine clutch to a predetermined target pressure based on a predetermined ration, wherein the predetermined target pressure is between the start pressure of the torque transmission and the learning pressure;
- measuring, by the control unit, an actual pressure of the engine clutch with a hydraulic pressure sensor when the pressure of the engine clutch increases to the predetermined target pressure based on the predetermined ratio;
- calculating, by the control unit, a difference value between the measured actual pressure of the engine clutch and the predetermined target pressure; and
- adjusting, by the control unit, the pressure of the engine clutch to correspond to the predetermined target pressure based on the difference value, and wherein the engine clutch is disposed between the engine and the motor.

2. The method of claim 1, wherein the increasing of the pressure of the engine clutch to the target pressure with the predetermined ratio includes:
increasing, by the control unit, the pressure of the engine clutch to the target pressure in a step-like manner.

3. The method of claim 2, wherein the number of steps to increase the pressure of the engine clutch in the step-like manner is at least two.

4. The method of claim 3, wherein the measuring the actual pressure of the engine clutch using the hydraulic pressure sensor includes:
measuring, by the control unit, the pressure of the engine clutch increased in the step-like manner at least two points.

5. The method of claim 3, wherein the measuring of the actual pressure of the engine clutch using the hydraulic pressure sensor includes:
measuring, by the control unit, the target pressure of the engine clutch in a pressure range in which linear characteristics of the hydraulic pressure sensor are maintained.

6. The method of claim 1, wherein the transmission is an automatic transmission.

7. A system for learning operation of an engine clutch of a hybrid vehicle, the system comprising:
- an engine clutch disposed between an engine and a motor of the hybrid vehicle to engage or disengage the engine and the motor;
- a solenoid valve configured to provide pressure to the engine clutch;
- a pressure detector configured to detect pressure of the engine clutch;
- an integrated starter generator (ISG) configured to start the engine or generate power;
- a transmission configured to shift power applied to vehicle wheels based on an operation of a shift stage lever and provide power accordingly; and
- a control unit configured to learn an operation of the engine clutch by operating the engine, the motor, the transmission, the ISG, the engine clutch, and the solenoid valve and monitoring states of the engine, the motor, the transmission, the ISG, the engine clutch, and the solenoid;

wherein the control unit is configured to learn by:
- determining whether power transmission of a transmission that transmits the output from the engine and the motor has been interrupted;
- operating the engine and the motor at different speeds;
- setting a torque of the motor as a first steady state torque when speed of the motor reaches a first steady state;
- increasing pressure of the engine clutch to engage the engine with the motor;
- after engaging the engine with the motor, setting pressure to change the torque of the motor from the first steady state torque to a predetermined torque as a starting pressure of torque transmission;
- supplying a learning pressure that is greater than the starting pressure of torque transmission to the engine clutch to engage the engine with the motor;
- after engaging the engine with the motor, setting the torque of the motor as a second steady state torque when speed of the motor reaches a second steady state; and
- learning a linear relation between pressure of the engine clutch and torque transmitted through the engine clutch based on a ratio of a difference value between the start pressure of the torque transmission and the learning pressure and a difference value between the first steady state torque and the second steady state torque wherein when the transmission is in park or neutral, the power transmission of the transmission is determined, by the control unit, to have been interrupted, wherein the learning, by the control unit, of the linear relation between the pressure of the engine clutch and the torque transmitted through the engine clutch includes:
- increasing pressure of the engine clutch to a predetermined target pressure based on a predetermined ratio, wherein the predetermined target pressure is between the start pressure of the torque transmission and the learning pressure;
- measuring an actual pressure of the engine clutch using a hydraulic pressure sensor when the pressure of the engine clutch increases to the predetermined target pressure based on the predetermined ratio;
- calculating a difference value between the measure actual pressure of the engine clutch and the predetermined target pressure; and
- adjusting the pressure of the engine clutch to correspond to the predetermined target pressured based on the difference value.

8. A non-transitory computer readable medium containing program instructions executed by a processor within a controller, the computer readable medium comprising:
- program instructions that determine whether power transmission of a transmission that transmits the output from an engine and a motor has been interrupted;
- program instructions that control the engine and the motor at different speeds;
- program instructions that set a torque of the motor as a first steady state torque when speed of the motor reaches a first steady state;
- program instructions that increase a pressure of the engine clutch to engage the engine with the motor;
- program instructions that after engaging the engine with the motor, set the pressure to change torque of the motor from the first steady state torque to a predetermined torque as a starting pressure of torque transmission;

program instructions that supply a learning pressure that is greater than the starting pressure of torque transmission to the engine clutch to engage the engine with the motor;

program instructions that after engaging the engine with the motor, set the torque of the motor as a second steady state torque when speed of the motor reaches a second steady state;

program instructions that learn a linear relation between pressure of the engine clutch and torque transmitted through the engine clutch based on a ratio of a difference value between the start pressure of the torque transmission and the learning pressure and a difference value between the first steady state torque and the second steady state torque;

program instruction that increase the pressure of the engine clutch to a predetermined target pressure based on a predetermined ratio, wherein the predetermined target pressure is between the start pressure of the torque transmission and the learning pressure;

program instructions that measure an actual pressure of the engine clutch using a hydraulic pressure sensor when the pressure of the engine clutch increases to the predetermined target pressure based on the predetermined ratio;

program instructions that calculate a difference value between the measured actual pressure of the engine clutch and the predetermined target pressure; and program instructions that adjust the pressure of the engine clutch to correspond to the predetermined target pressure based on the difference value, wherein when the transmission is in park or neutral, the power transmission of the transmission is determined, by the controller, to have been interrupted, wherein the engine clutch is disposed between the engine and the motor and is included in a hybrid electric vehicle and connects and cuts off power between the engine and the motor by engaging or disengaging the engine with the motor.

* * * * *